US012755660B2

(12) United States Patent
Oh et al.

(10) Patent No.: US 12,755,660 B2
(45) Date of Patent: Oct. 6, 2026

(54) DISPLAY APPARATUS AND DATA PROCESSING METHOD THEREOF

(71) Applicant: LG Display Co., Ltd., Seoul (KR)

(72) Inventors: Seung Cheol Oh, Paju-si (KR); Woong Jin Seo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/303,021

(22) Filed: Aug. 18, 2025

(65) Prior Publication Data

US 2026/0155069 A1 Jun. 4, 2026

(30) Foreign Application Priority Data

Nov. 29, 2024 (KR) ........................ 10-2024-0175030

(51) Int. Cl.
*G09G 3/00* (2006.01)
*G09G 3/20* (2006.01)

(52) U.S. Cl.
CPC ............ *G09G 3/007* (2013.01); *G09G 3/003* (2013.01); *G09G 3/2003* (2013.01); *G09G 2320/0233* (2013.01); *G09G 2320/0666* (2013.01)

(58) Field of Classification Search
None
See application file for complete search history.

(56) References Cited

U.S. PATENT DOCUMENTS

| | | | | |
|---|---|---|---|---|
| 6,108,029 | A * | 8/2000 | Lo | G02B 30/31 348/E13.044 |
| 6,681,053 | B1 | 1/2004 | Zhu | |
| 7,477,331 | B2 * | 1/2009 | Lin | G02B 30/31 348/51 |
| 2003/0095135 | A1 * | 5/2003 | Kaasila | G06F 16/9577 345/613 |
| 2004/0189655 | A1 * | 9/2004 | Perry | G06T 11/10 345/582 |
| 2004/0193389 | A1 * | 9/2004 | Perry | G06T 11/23 703/2 |
| 2009/0324202 | A1 | 12/2009 | Okubo et al. | |
| 2010/0118045 | A1 | 5/2010 | Brown Elliott et al. | |
| 2010/0238267 | A1 | 9/2010 | Izzat et al. | |

(Continued)

FOREIGN PATENT DOCUMENTS

| | | |
|---|---|---|
| JP | 2001-117529 A | 4/2001 |
| JP | 2010-220150 A | 9/2010 |

(Continued)

OTHER PUBLICATIONS

European Patent Office, Extended European Search Report, European Patent Application No. 25198060.3, Jan. 2, 2026, nine pages.

*Primary Examiner* — Matthew Yeung
(74) *Attorney, Agent, or Firm* — Fenwick & West LLP

(57) ABSTRACT

A display apparatus includes a display panel having a pixel shift structure for three-dimensional (3D) implementation, a parallax film disposed on the display panel and including a plurality of lenses, and a bypass circuit configured to, when edge image data implementing an edge area of a two-dimensional (2D) input image is a clear type, output the edge image data of the clear type in a state where color map conversion corresponding to the pixel shift structure of the display panel is not applied, in a 2D mode.

10 Claims, 10 Drawing Sheets

(56) References Cited

U.S. PATENT DOCUMENTS

| | | | | |
|---|---|---|---|---|
| 2012/0062990 | A1 | 3/2012 | Okamoto | |
| 2012/0086708 | A1 | 4/2012 | Lin et al. | |
| 2013/0208020 | A1 | 8/2013 | Jung et al. | |
| 2013/0222407 | A1 | 8/2013 | Matskewich et al. | |
| 2014/0015864 | A1* | 1/2014 | Kim | H04N 13/30 345/690 |
| 2014/0092223 | A1 | 4/2014 | Lin | |
| 2014/0233101 | A1 | 8/2014 | Takagi et al. | |
| 2015/0124061 | A1 | 5/2015 | Jian | |
| 2016/0234487 | A1 | 8/2016 | Kroon et al. | |
| 2016/0360191 | A1 | 12/2016 | Yang et al. | |
| 2018/0107010 | A1* | 4/2018 | Wang | G02B 30/29 |
| 2018/0144451 | A1* | 5/2018 | Michail | G06T 11/23 |
| 2020/0244944 | A1* | 7/2020 | Xin | G06F 40/10 |
| 2024/0179290 | A1* | 5/2024 | Ma | G02B 30/27 |

FOREIGN PATENT DOCUMENTS

| | | | |
|---|---|---|---|
| JP | 2012-58599 | A | 3/2012 |
| JP | 2012-85248 | A | 4/2012 |
| JP | 2012-151832 | A | 8/2012 |
| JP | 2014-71455 | A | 4/2014 |
| JP | 2015-89140 | A | 5/2015 |
| JP | 2016-539381 | A | 12/2016 |
| KR | 10-2012-0063213 | A | 6/2012 |
| WO | 2013/061458 | A1 | 5/2013 |

* cited by examiner

DISPLAY APPARATUS AND DATA PROCESSING METHOD THEREOF

CROSS-REFERENCE TO RELATED APPLICATIONS

This application claims the benefit of Korean Patent Application No. 10-2024-0175030 filed on Nov. 29, 2024, which is hereby incorporated by reference as if fully set forth herein.

BACKGROUND

Field of the Invention

The present disclosure relates to a display apparatus and a data processing method thereof.

Discussion of the Related Art

Light field three-dimensional (3D) display (LFD) apparatuses which display a 3D image have been known as a glasses-free type. LFD apparatuses form a parallax between a left-eye image and a right-eye image by using a parallax film attached to a display panel, and thus, provide a sense of three dimensions to a user.

However, because such display apparatuses include a pixel structure optimized for 3D implementation, the sharpness of a two-dimensional (2D) image may be reduced when displaying a 2D image.

SUMMARY

To overcome the aforementioned problem of the related art, the present disclosure may provide a display apparatus and a data processing method thereof, which may solve a problem where sharpness is reduced when displaying a two-dimensional (2D) image on a display panel including a pixel structure for three-dimensional (3D) implementation.

To achieve these objects and other advantages and in accordance with the purpose of the disclosure, as embodied and broadly described herein, a display apparatus includes: a display panel having a pixel shift structure for three-dimensional (3D) implementation; a parallax film disposed in the display panel and including a plurality of lenses; and a bypass circuit configured to, when edge image data implementing an edge area of a two-dimensional (2D) input image is a clear type, output the edge image data of clear type in a state where color map conversion corresponding to the pixel shift structure of the display panel is not applied, in a 2D mode.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

Figure 1:
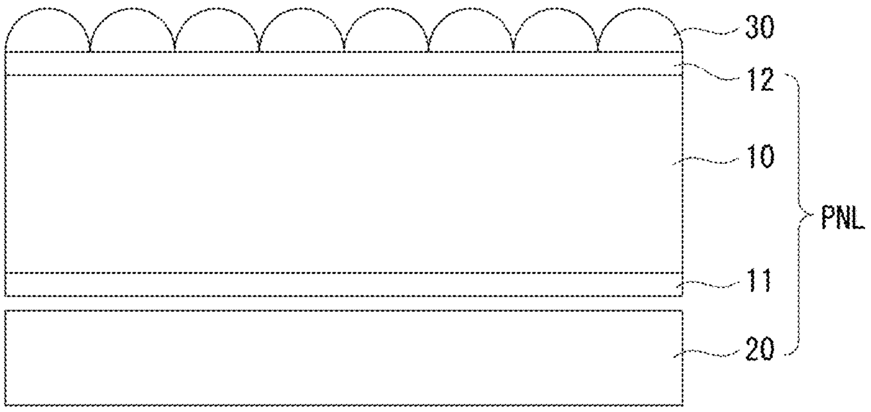
FIG. 1 is a cross-sectional view schematically illustrating a display apparatus according to an embodiment of the present disclosure.

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms "comprise", "having," "including" and the like suggest that other parts can be added unless the term "only" is used. As used herein, the singular forms "a", "an", and "the" are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as "on~", "over~", "under~", and "next~", one or more other parts may be disposed between the two parts unless "just" or "direct" is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings.

Figure 2:
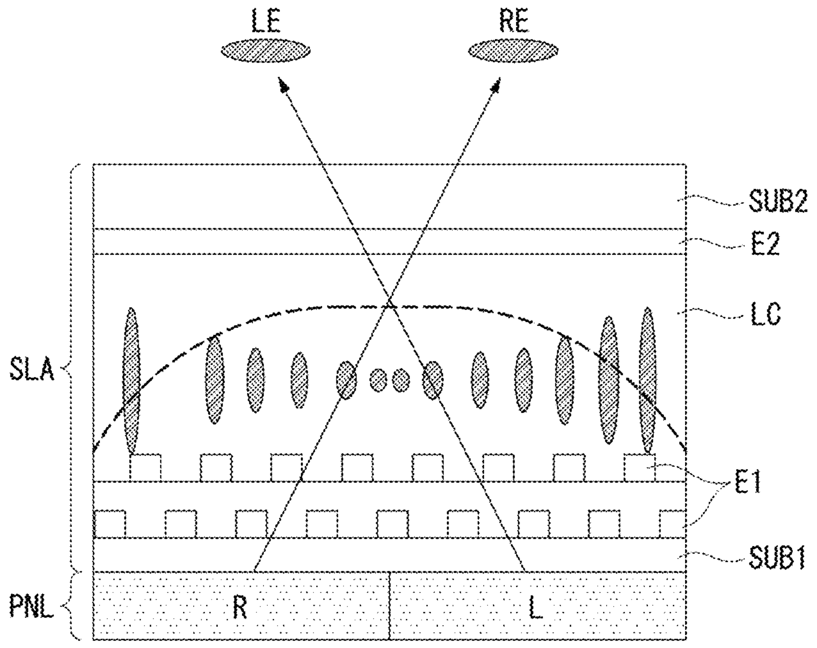
FIG. 2 is a diagram illustrating an implementation example of a parallax film bonded to a display panel.

FIG. 1 is a cross-sectional view schematically illustrating a display apparatus according to an embodiment of the present disclosure. FIG. 2 is a diagram illustrating an implementation example of a parallax film bonded to a display panel.

Referring to FIG. 1, the display apparatus according to an embodiment of the present disclosure may include a display panel PNL which displays a two-dimensional (2D) image in a 2D mode and displays a three-dimensional (3D) image in a 3D mode and a parallax film 30 which is disposed on the display panel PNL and includes a plurality of lenses.

The display panel PNL may be implemented as a liquid crystal panel which includes a pixel array 10, first and second polarizers 11 and 12, and a light source unit 20. The pixel array 10 may include a lower substrate and an upper substrate opposite to each other, a liquid crystal layer filled therebetween, a thin film transistor (TFT) array provided in the lower substrate, and a color filter array provided in the upper substrate. The pixel array 10 may include a plurality of liquid crystal cells which are light receiving elements. The light source unit 20 may supply light to the pixel array 10. A light source used in the light source unit 20 may be a fluorescent lamp array, a light emitting diode (LED) array, or a laser source array. To induce uniform surface light emission, the light source unit 20 may include a light guide plate and a plurality of optical sheets. Also, when the display panel PNL includes a self-emitting device, the light source unit 20 may be omitted. The display panel PNL may be implemented as an electrophoretic panel, a quantum dot panel, or an organic light emitting panel.

The first and second polarizers 11 and 12 may respectively have transmissive axes intersecting each other. The first and second polarizers 11 and 12 may be omitted at one side or both sides, based on the kind of display panel PNL.

The parallax film 30 may divide an image into a plurality of views (hereinafter referred to as a 'view') in a three-dimensional (3D) mode. The parallax film 30 may be implemented as a lenticular lens array where lenses having a certain curvature and a certain pitch are regularly arranged. As in FIG. 2, the lenticular lens array may be a switchable lens array SLA which is turned on or off by a control voltage and is adjusted in refractive index variation. One of a 3D mode and a two-dimensional (2D) mode may be selectively implemented by the turn-on/off of the switchable lens array SLA.

The switchable lens array SLA may include first and second substrates SUB1 and SUB2 opposite to each other, a liquid crystal layer LC between the first and second substrates SUB1 and SUB2, a second electrode E2 in the second substrate SUB2, and a plurality of first electrodes E1 which are provided in the first substrate SUB1 to correspond to a lens area corresponding to a pitch.

The switchable lens array SLA may output a 2D image or a 3D image, based on whether a voltage is applied thereto. The switchable lens array SLA may output a 3D image in the 3D mode, based on the application of a voltage, and may output a 2D image in the 2D mode, based on the non-application of a voltage.

In the 3D mode, a highest voltage may be applied to a first electrode E1 which is disposed at a center of the lens area, a voltage which decreases progressively in a direction distancing from the center of the lens area may be applied to a first electrode E1, and a lowest voltage among voltages applied to the first electrodes E1 may be applied to the second electrode E2. At this time, a refractive index may be smallest at the center of the lens area and may increase progressively in a direction distancing from the center of the lens area, and thus, an optical refractive index difference corresponding to a plurality of views may be obtained. As a result, a left-eye image L of the display panel PNL may be provided to a left eye LE of a viewer (or a user) through the switchable lens array SLA, and a right-eye image R of the display panel PNL may be provided to a right eye RE of the viewer (or the user) through the switchable lens array SLA.

In the 2D mode, based on the non-application of a voltage, there may be no refractive index difference between the first electrodes E1 and the second electrode E2, and thus, the switchable lens array SLA may function like a transparent film. As a result, a 2D image of the display panel PNL may be provided to both eyes of a user through the switchable lens array SLA.

Figure 3:
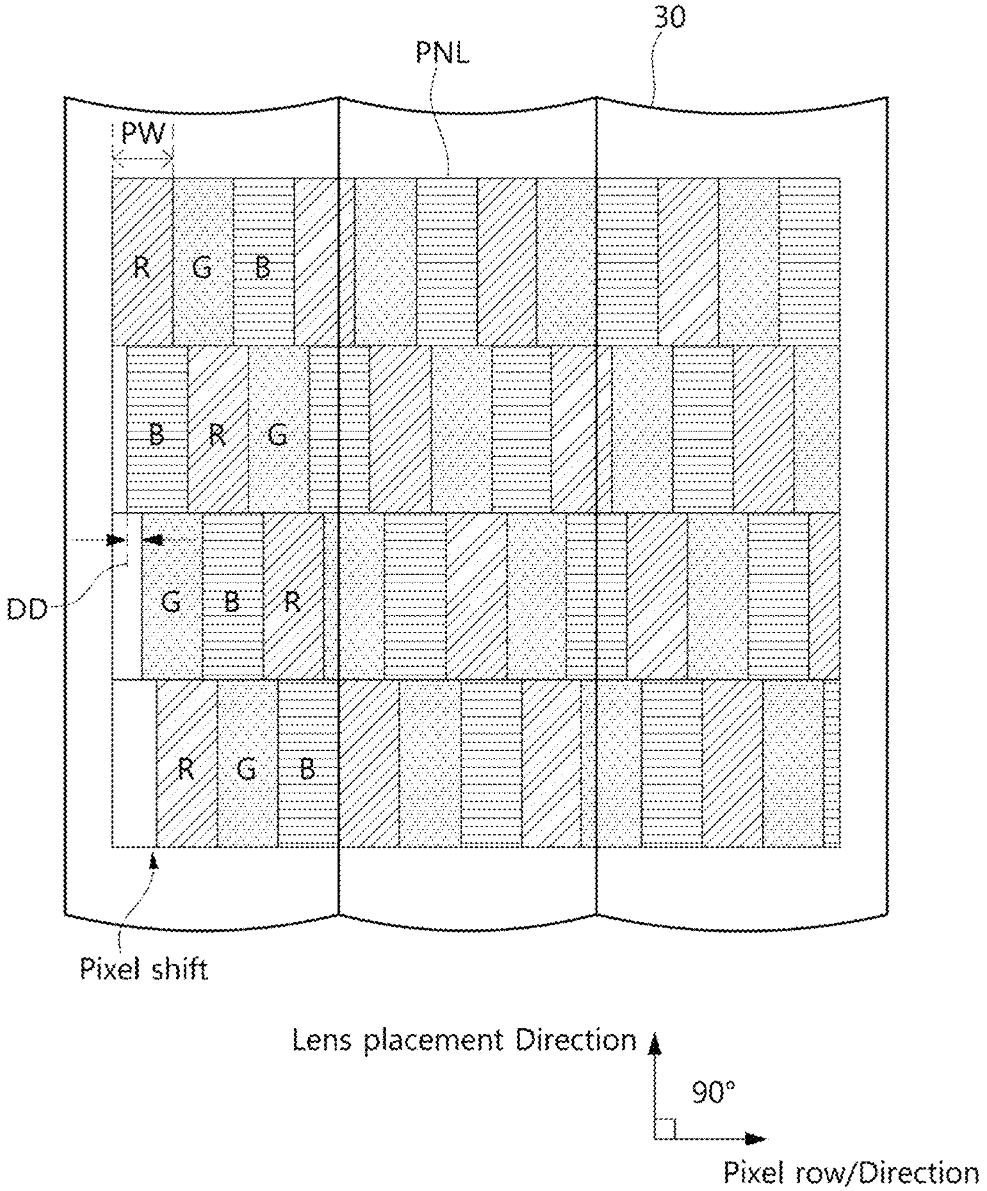
FIG. 3 is a diagram illustrating an align relationship between a parallax film and a display panel having a pixel shift structure.

FIG. 3 is a diagram illustrating an align relationship between a parallax film and a display panel having a pixel shift structure.

Referring to FIG. 3, a display panel PNL may have a pixel shift structure for 3D implementation. In other words, the display panel PNL may include a first pixel row including first pixels and a second pixel row including second pixels adjacent to the first pixels, and with respect to positions of the first pixels, positions of the second pixels may be shifted by a predetermined interval DD in a pixel row direction. A shift interval DD may be ¼ of a subpixel width PW. As a result, in the same pixel column, an RGB pixel, a BRG pixel, and a GBR pixel may be continued and repeatedly arranged.

In this case, a placement direction of lenses provided in the parallax film 30 may be perpendicular to a pixel row direction. That is, the parallax film 30 may be attached to the display panel PNL in a direction perpendicular to the pixel row direction without being inclined.

Adjacent pixel rows may be arranged as a zigzag type shifted by a ¼ subpixel width PW, and the parallax film 30 may be attached to the display panel PNL in a direction perpendicular to the pixel row direction, and thus, a reduction in luminance of a 2D image may be minimized, and view division may be easily performed without overlapping of views of a 3D image.

Figure 4:
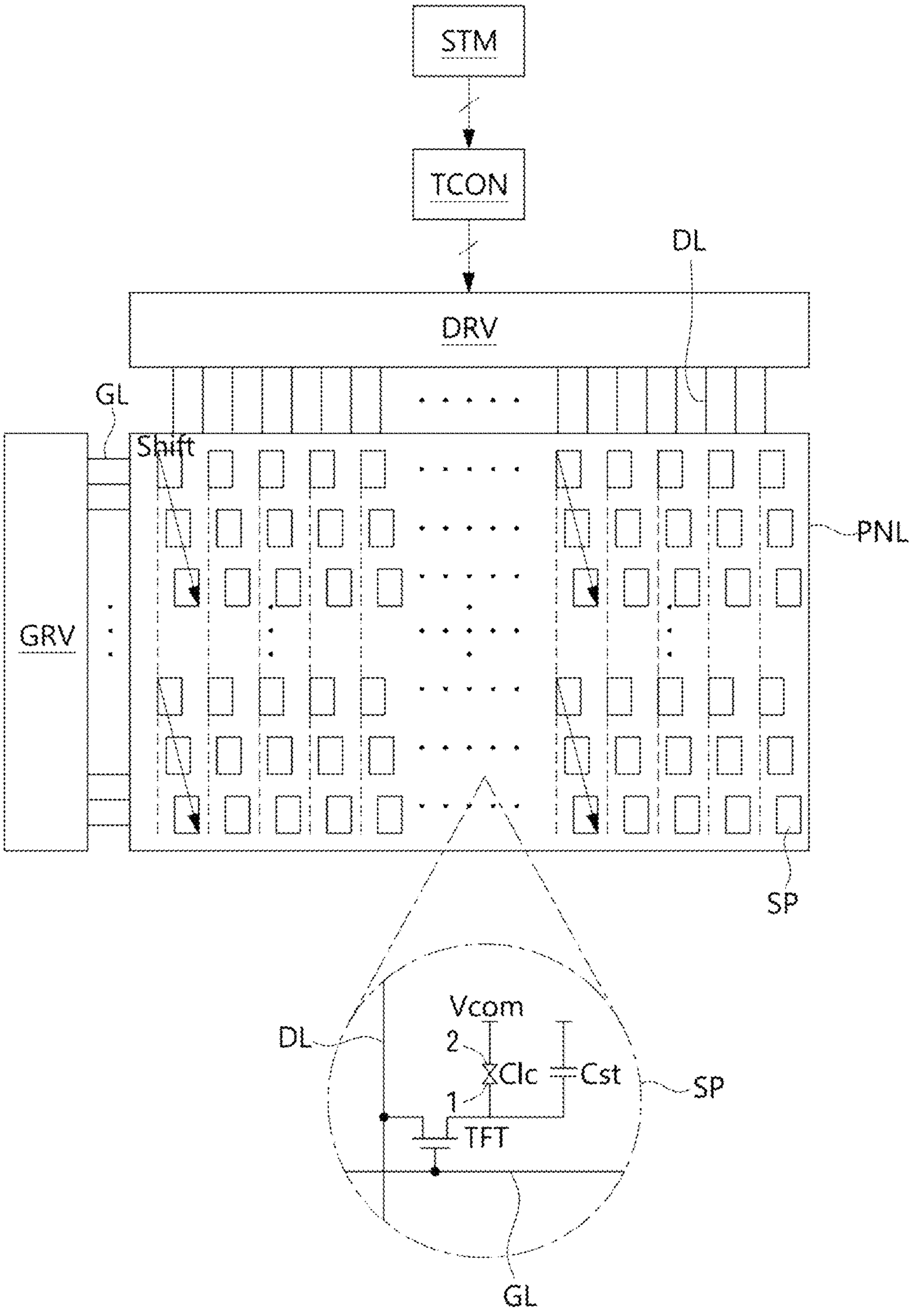
FIG. 4 is a functional block diagram illustrating a display apparatus according to an embodiment of the present disclosure.

FIG. 4 is a functional block diagram illustrating a display apparatus according to an embodiment of the present disclosure. The display apparatus according to an embodiment of the present disclosure may include the parallax film 30 described above, but is omitted for convenience in FIG. 4.

Referring to FIG. 4, the display apparatus according to an embodiment of the present disclosure may include a host system STM, a timing controller TCON, a data driver DRV which drives data lines DL of the display panel PNL, and a gate driver GRV which drives gate lines GL of the display panel PNL.

A liquid crystal cell Clc of the display panel PNL may be an R, G, or B subpixel SP. A placement position of the subpixel SP may be shifted by a certain interval by pixel row units.

The liquid crystal cell Clc may be driven by a voltage difference between a pixel electrode 1 charged with a data voltage through a TFT and a common electrode 2 to which a common voltage Vcom is applied. The common voltage Vcom may be supplied to the common electrode 2 through a common voltage supply line. A storage capacitor Cst which holds a voltage of the liquid crystal cell during one frame period may be connected to the liquid crystal cell Clc.

The host system STM may be implemented as one of a television system, a set-top box, a navigation system, a DVD player, a Blu-ray player, a personal computer (PC), a home theater system, and a phone system. The host system STM may convert digital video data of an input image into a format suitable for the display panel PNL. The host system STM may transfer the digital video data of the input image and timing signals Vsync, Hsync, DE, and CLK to the timing controller TCON.

The timing controller TCON may receive the timing signals such as a vertical synchronization signal Vsync, a horizontal synchronization signal Hsync, a data enable signal DE, and a main clock CLK from the host system STM. The timing signals may be synchronized with the digital video data of the input image. The timing controller TCON may generate a source timing control signal for controlling an operation timing of the data driver DRV and a gate timing control signal for controlling an operation timing of the gate driver GRV by using the timing signals Vsync, Hsync, DE, and CLK.

The timing controller TCON may enable the 2D mode for implementing a 2D image or the 3D mode for implementing a 3D image in response to an external input.

The timing controller TCON may transfer the digital video data of the input image, received from the host system STM, to the data driver DRV. To improve a reduction in sharpness of a 2D image caused by a pixel shift structure, the timing controller TCON may include a data processing circuit where an operation thereof is enabled in the 2D mode. In the 2D mode, the timing controller TCON may transfer an output of the data processing circuit to the data driver DRV.

Based on the source timing control signal, the data driver DRV may sample and latch image data to convert into data of a parallel data format. Also, the data driver DRV may convert pieces of latched data into analog gamma compensation voltages to generate data voltages and may supply the data voltages to the data lines DL.

Based on the gate timing control signal, the gate driver GRV may generate a gate pulse (or a scan pulse) synchronized with a data voltage to supply the gate pulse to the gate lines GL.

Figure 5:
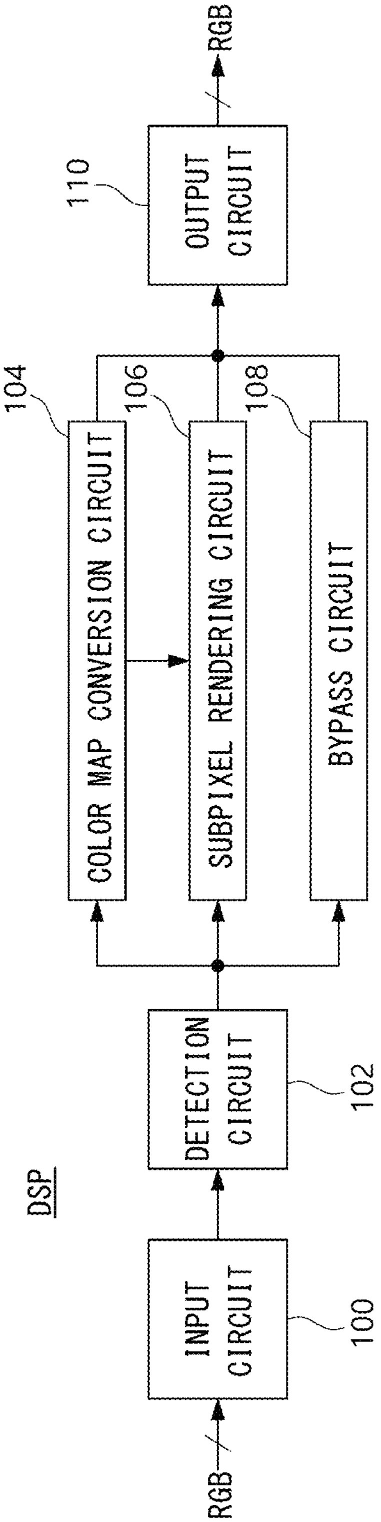
FIG. 5 is a diagram illustrating a configuration of a data processing circuit of a display apparatus according to an embodiment of the present disclosure.
Figure 6:
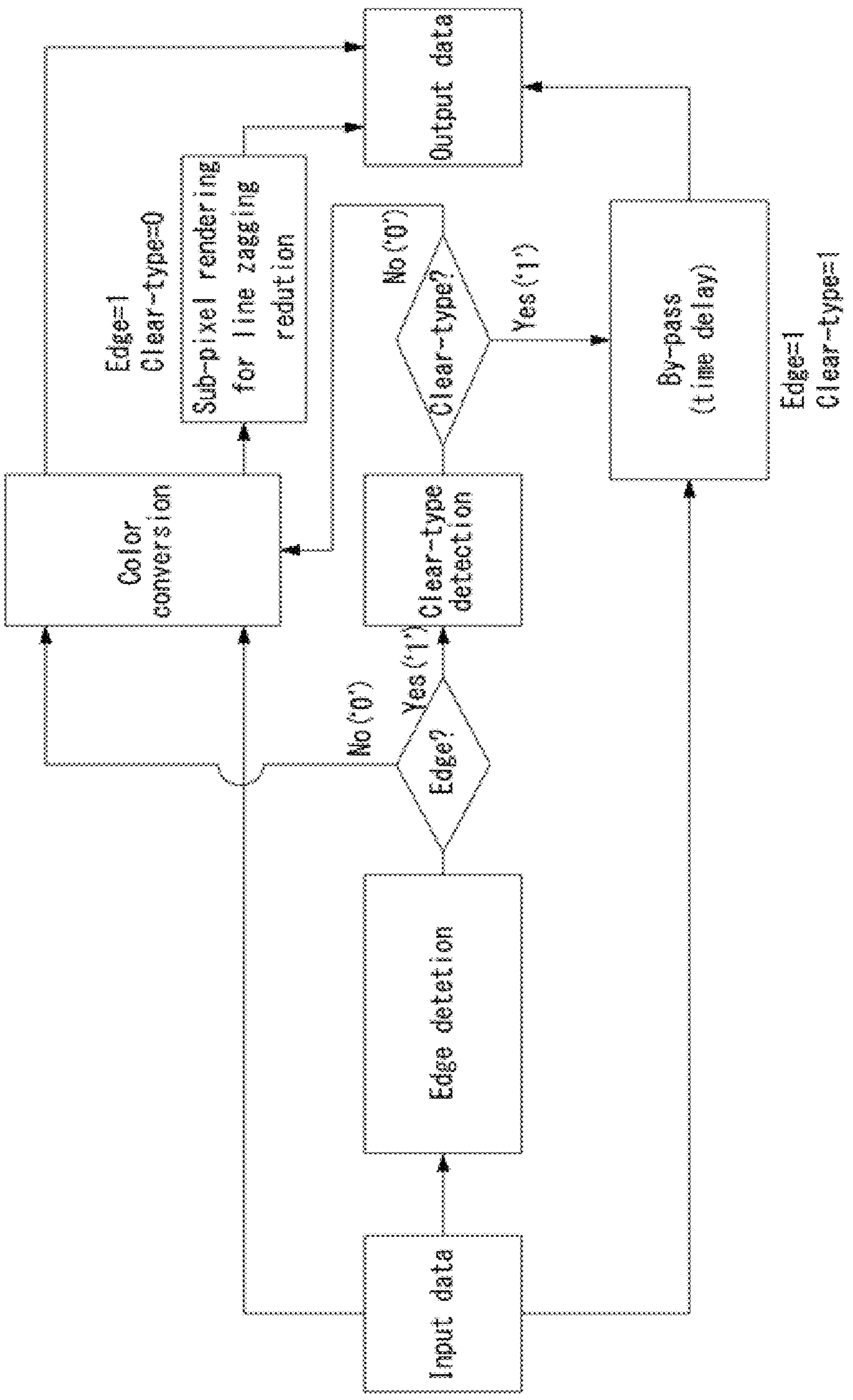
FIG. 6 is a diagram illustrating an operation of the data processing circuit.
Figure 7:
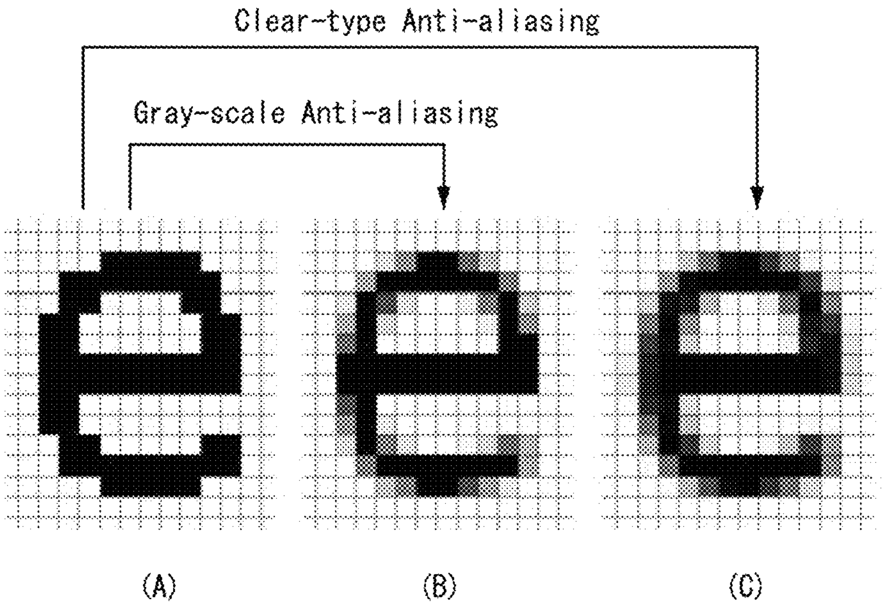
FIG. 7 is a diagram illustrating an example of a result to which subpixel rendering technology of a clear type is applied.
Figure 8:
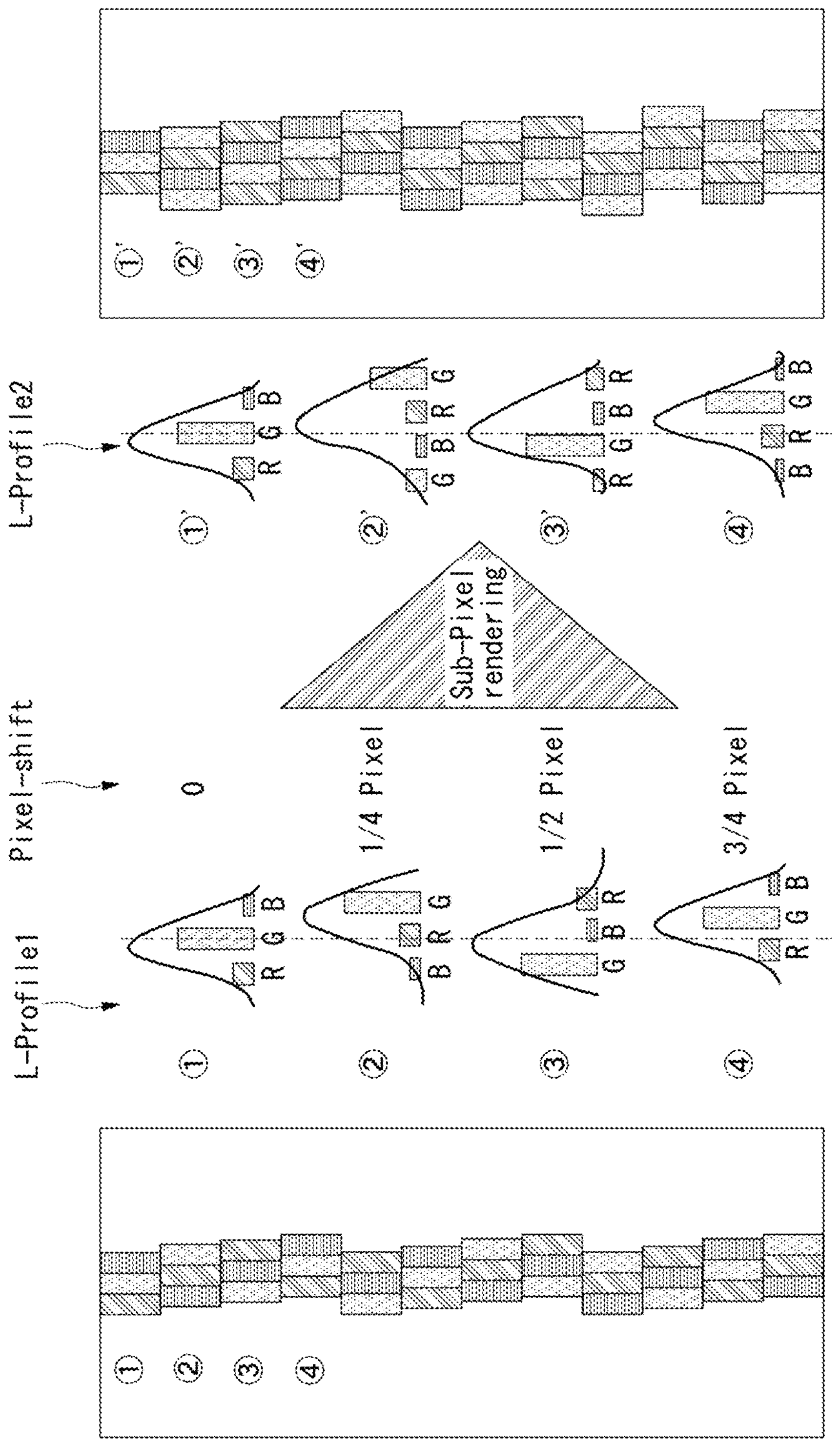
FIGS. 8 and 9 are diagrams illustrating a subpixel rendering operation for anti-aliasing processing according to an embodiment of the present disclosure.
Figure 9:
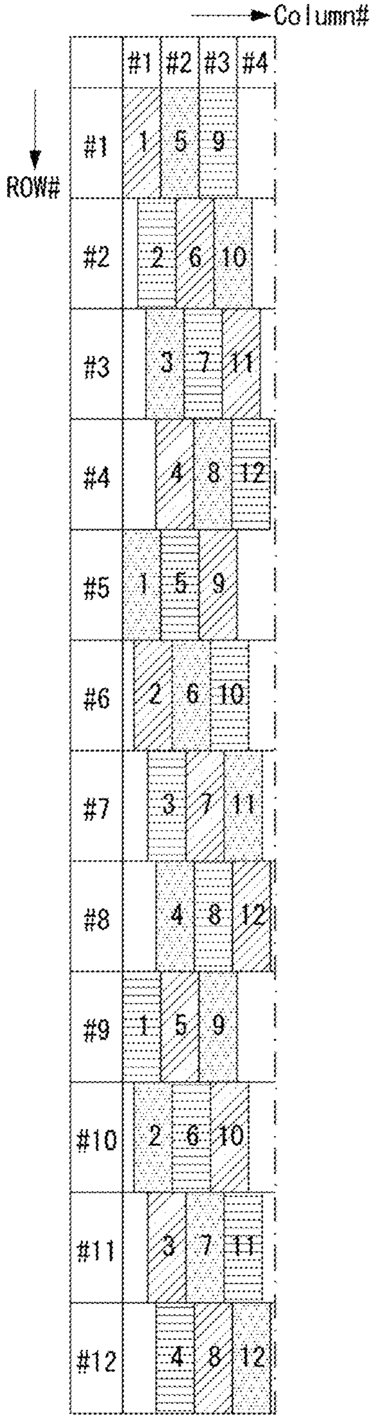

FIG. 5 is a diagram illustrating a configuration of a data processing circuit of a display apparatus according to an embodiment of the present disclosure. FIG. 6 is a diagram illustrating an operation of the data processing circuit of FIG. 5. FIGS. 7 to 9 are diagrams needed for describing a data processing operation of FIG. 6.

Referring to FIGS. 5 and 6, a data processing circuit DSP according to an embodiment of the present disclosure may be for improving a reduction in sharpness which occurs when displaying a 2D image on a display panel having a pixel structure for 3D implementation. Accordingly, the data processing circuit DSP may be enabled in operation in the 2D mode, and at least some elements thereof may not operate in the 3D mode.

The data processing circuit DSP may include an input circuit 100, a detection circuit 102, a color map conversion circuit 104, a subpixel rendering circuit 106, a bypass circuit 108, and an output circuit 110.

In the 2D mode, the input circuit 100 may receive image data, which is for implementing a 2D input image, from an external image source circuit (a host system or the like).

The detection circuit 102 may detect a letter in 2D input image data and may determine whether the letter is a clear type or a non-clear type.

The detection circuit 102 may detect an edge area of the 2D input image data by using a predetermined operator (for example, a Sobel operator), so as to detect a letter position in the 2D input image data. The Soble operator may be a representative first-order differential slope operator. Because a letter has a large pixel value difference with a peripheral background, and pixel values of the letter are similar to each other, a large slope value may appear in an edge portion of the letter. The detection circuit 102 may detect an edge area corresponding to a letter portion from an input image by using, as a mask, an image representing a letter position obtained through the Soble operator.

The detection circuit 102 may detect whether edge image data is a clear type or a non-clear type, based on a luminance component (Y) variation or a chrominance component (Cb, Cr) variation of edge image data implementing an edge area.

When the chrominance component (Cb, Cr) variation of the edge image data is greater than a predetermined threshold value, or the luminance component (Y) variation of the edge image data is greater than a predetermined threshold value, the detection circuit 102 may detect corresponding edge image data as a clear type. When the chrominance component (Cb, Cr) variation of the edge image data is not greater than the predetermined threshold value, or the luminance component (Y) variation of the edge image data is not greater than the predetermined threshold value, the detection circuit 102 may detect corresponding edge image data as a non-clear type.

A clear type may be font rendering technology of Microsoft Window and may improve a shape of a letter string through a specific method of a computer display screen. A clear type rendering method, as in FIG. 7 (C), may use anti-aliasing to further smooth a letter string in a subpixel and decrease anti-aliasing. In FIG. 7 (B), a grayscale rendering method may be performed by pixel units and may be a grayscale anti-aliasing method, and in FIG. 7 (C), the clear type rendering method may be an anti-aliasing method performed by subpixel units. Because eyes of persons are sensitive to a variation of brightness and are insensitive to a change in color, eyes of persons may not well feel a change in color within a narrow range. Based thereon, the clear type rendering may actually sacrifice a portion (a sense of color) of image quality, for brightness difference. When a letter of black gray level is expressed in a background of a white gray level, the clear type rendering may use a method which decreases or increases a gray level in the order of RGB subpixels so as to reduce a rapid luminance variation between the background and the letter. However, because the clear type rendering has been developed with respect to an RGB stripe, it may be difficult to obtain a desired anti-aliasing effect when a pixel structure is a mixture of RGB/GBR/BRG.

The clear type rendering may be applied to a true type font or an open type font where a user and system application programs are expressed. For example, a letter string input to Microsoft Word may be expressed by applying the clear type rendering technology. That is, the clear type rendering technology may be applied to only a letter string expressed on a specific kind of computer display.

Because a display panel has a pixel shift structure such as RGB, BRG, and GBR for 3D implementation, a color map conversion process of converting a color map of input image data according to a pixel shift structure may be needed. On the other hand, in a case where image data of a clear type is included in an input image, a problem such as unintended letter border discoloration or reduction in sharpness may occur when undergoing a color map conversion process. As described above, this may be because image data of a clear type is optimized for an RGB stripe structure.

The bypass circuit 108 may receive a detection result from the detection circuit 102. When edge image data implementing an edge area of a 2D input image is a clear type, the bypass circuit 108 may output edge image data of the clear type in a state where color map conversion corresponding to the pixel shift structure of the display panel is not applied. As described above, when edge image data configuring a letter of the clear type is bypassed without color map conversion, a side effect such as a reduction in sharpness may be minimized in an image of a corresponding position. That is, when edge image data configuring a letter of the clear type is bypassed without color map conversion, an anti-aliasing effect proportional to the degree to which the clear type is applied may be obtained.

The color map conversion circuit 104 may receive a detection result from the detection circuit 102. The color map conversion circuit 104 may convert and output a color map of edge image data of a non-clear type and a color map of non-edge image data, based on the pixel shift structure of the display panel. The non-edge image data may be image data implementing the other area except an edge area in an input image.

A color map conversion operation of the color map conversion circuit 104 will be described below with reference to the pixel shift structure of FIG. 3.

A shift of a color map may be omitted on a 4k-3$^{rd}$ (where k may be a natural number) pixel row of RGB repetition. A color map of a 4k-2$^{nd}$ pixel row of BRG repetition may be shifted to the right by a ¼ subpixel width PW compared to the 4k-3$^{rd}$ pixel row. A color map of a 4k-1$^{st}$ pixel row of GBR repetition may be shifted to the right by a ¼ subpixel width PW compared to the 4k-2$^{nd}$ pixel row. A color map of a 4k$^{th}$ pixel row of RGB repetition may be shifted to the right by a ¼ subpixel width PW compared to the 4k-1$^{st}$ pixel row.

The subpixel rendering circuit 106 may receive a detection result from the detection circuit 102 and may receive a color map conversion result from the color map conversion circuit 104.

The subpixel rendering circuit 106 may perform anti-aliasing of edge image data of the non-clear type where a color map is converted and may output anti-aliased edge image data, and thus, may improve line zagging which occurs in the edge image data of the non-clear type. The reason that line zagging is recognized may be because an RGB placement order differs based on positions when pixel shift is applied, and thus, a fluctuation range of a luminance peak is large depending on vertical positions when expressing a straight line.

To minimize the fluctuation range of a position-based luminance peak, the subpixel rendering circuit 106 may improve line zagging through subpixel rendering, based on a G subpixel position and neighborhood subpixels.

In a general RGB stripe structure, a G subpixel having highest luminance may be disposed at a center, and R/B subpixels may be disposed at a left side and a right side of the G subpixel. A subpixel placement order may be constant regardless of a position, and thus, there may be no problem of sharpness. However, because the pixel shift structure is designed based on only 3D image quality, and thus, an RGB placement order is shifted by certain units in a pixel column direction, a reduction in sharpness may occur. In causes of sharpness reduction, a first cause may be that a luminance profile is changed as a position of a G subpixel having highest luminance is changed, and a second cause may be that RGB displacement orders between adjacent pixel rows differ.

To solve such a problem, the subpixel rendering circuit 106 may vary a luminance of first edge image data which is to be displayed on subpixels of a target pixel and may vary a luminance of second edge image data which is to be displayed on one subpixel of a neighborhood pixel adjacent to the target pixel, so that a luminance peak of a luminance profile of each pixel corresponding to edge image data of a non-clear type is disposed at a center of each pixel.

The subpixel rendering circuit 106 may use a subpixel near a corresponding pixel so that a luminance peak of a luminance profile of a target pixel is disposed at a center of the corresponding pixel.

For example, as in FIG. 8, ② a luminance peak may be disposed close to a right G subpixel in a luminance profile (L-Profile 1) of a non-shift state of a BRG pixel (targe pixel). Therefore, when a luminance of a corresponding G subpixel decreases by a first value through subpixel rendering, and a luminance of a left G subpixel included in an adjacent pixel increases by the first value, a luminance peak of a luminance profile (L-Profile 2) of the target pixel may move to a center of the target pixel (see ②'GBRG).

Moreover, ③ a luminance peak may be disposed close to a left G subpixel in a luminance profile (L-Profile 1) of a non-shift state of a GBR pixel (targe pixel). Therefore, when a luminance of an R subpixel decreases by the first value through subpixel rendering, and a luminance of a right R subpixel included in an adjacent pixel increases by the first value, a luminance peak of a luminance profile (L-Profile 2) of the target pixel may move to a center of the target pixel (see ③'RGBR).

A subpixel rendering operation performed by the subpixel rendering circuit 106 will be additionally described below with reference to FIG. 9.

Referring to FIG. 9, the subpixel rendering circuit 106 may decrease a B luminance of a target pixel and may increase a B luminance of a left adjacent pixel, in RGB of pixel row positions Nos. 4, 6, and 11, and thus, may move a luminance peak of a luminance profile of the target pixel in a center direction of the target pixel.

The subpixel rendering circuit 106 may decrease a G luminance of a target pixel and may increase a G luminance of a left adjacent pixel, in BRG of pixel row positions Nos. 2, 7, 9, and 12, and thus, may move a luminance peak of a luminance profile of the target pixel in a center direction of the target pixel.

The subpixel rendering circuit 106 may decrease a G luminance of a target pixel and may increase a G luminance of a right adjacent pixel, in GBR of pixel row positions Nos. 5 and 10, and thus, may move a luminance peak of a luminance profile of the target pixel in a center direction of the target pixel.

The subpixel rendering circuit 106 may decrease an R luminance of a target pixel and may increase an R luminance of a left adjacent pixel, in GBR of pixel row positions Nos. 3 and 8, and thus, may move a luminance peak of a luminance profile of the target pixel in a center direction of the target pixel.

As described above, the subpixel rendering circuit 106 may perform subpixel rendering to minimize a variation of a luminance peak, based on the degree of pixel shift and a luminance profile. At this time, a rendering weight for luminance adjustment may be differently adjusted based on the degree of pixel shift and the luminance profile.

The output circuit 110 may receive an output of each of the color map conversion circuit 104, the subpixel rendering circuit 106, and the bypass circuit 108 to transfer the received outputs to the data driver.

Figure 10:
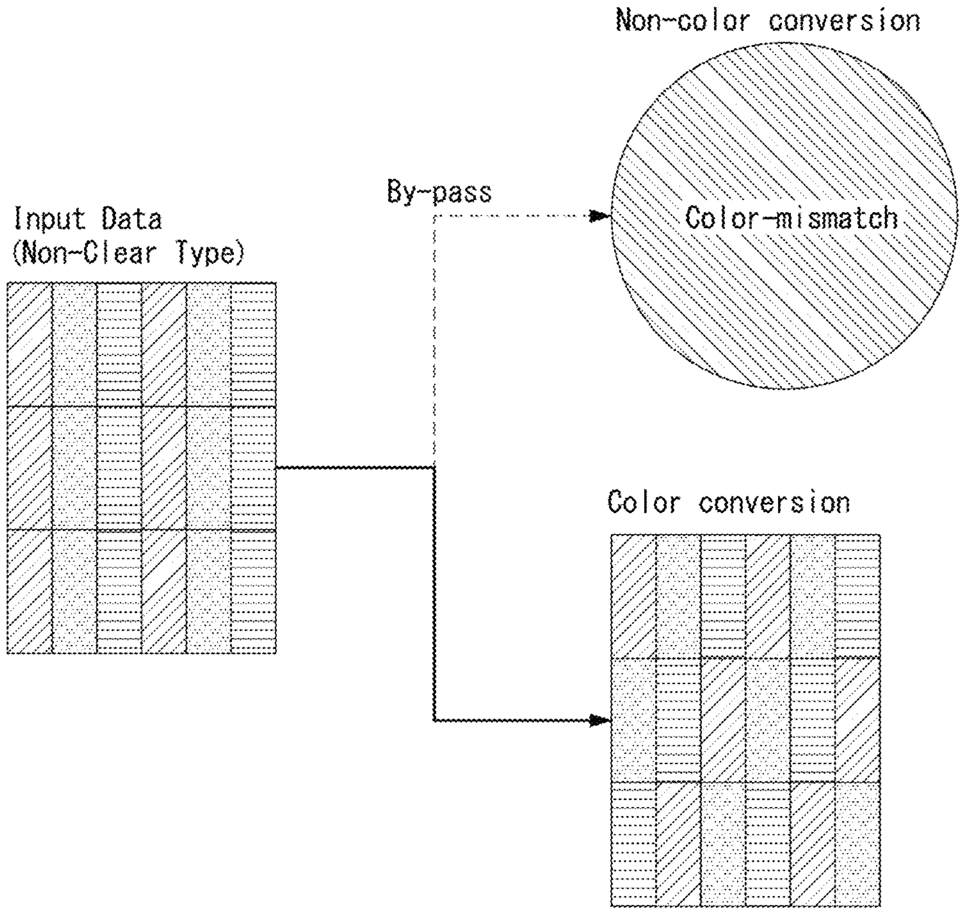
FIG. 10 is a diagram illustrating a case where color map conversion is applied to edge image data of a non-clear type.

FIG. 10 is a diagram illustrating a case where color map conversion is applied to edge image data of a non-clear type.

Referring to FIG. 10, when color map conversion is not performed on edge image data of a non-clear type according to a pixel shift structure, a color mismatch may occur. To prevent such a color mismatch, color map conversion should be performed on edge image data of a non-clear type according to the pixel shift structure.

Figure 11:
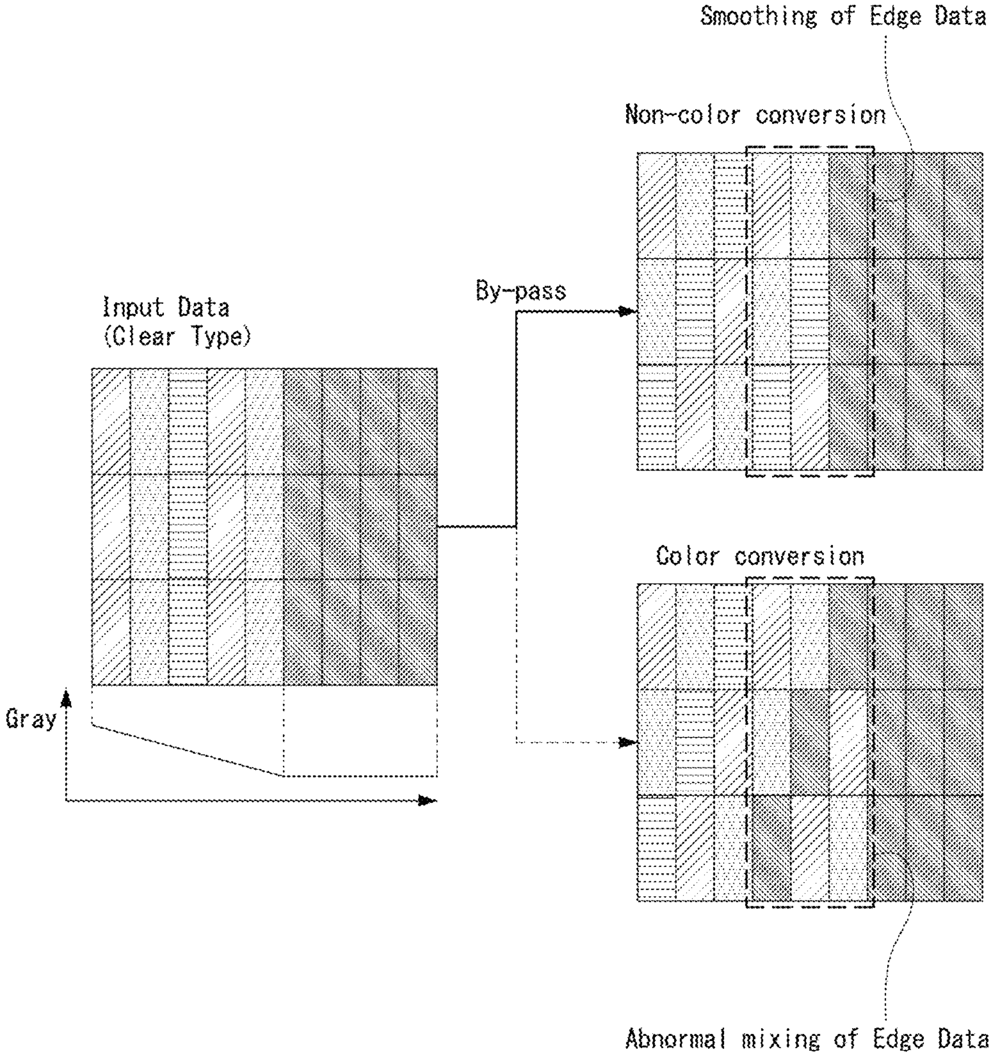
FIG. 11 is a diagram illustrating a case where color map conversion is not applied to edge image data of a clear type.

FIG. 11 is a diagram illustrating a case where color map conversion is not applied to edge image data of a clear type.

Referring to FIG. 11, when color map conversion is performed on edge image data of a clear type according to a pixel shift structure, edge data may be abnormally mixed, and due to this, it may be difficult to expect an anti-aliasing effect based on a clear type, and the sharpness of an image may be considerably reduced.

Accordingly, when color map conversion is skipped and bypassed on edge image data of a clear type, a problem where the sharpness of an image is reduced may be solved, and an anti-aliasing effect based on a clear type may be expected to some degree.

In the present disclosure, a color map conversion operation may be skipped on only edge image data of a clear type included in a 2D input image and may be performed on edge image data of a non-clear type and non-edge image data, based on a pixel shift structure of a display panel. Accordingly, the present disclosure may solve a problem (i.e., an issue occurring in a clear type) where sharpness is reduced when displaying a 2D image on a display panel including a pixel structure for 3D implementation.

The present disclosure may perform subpixel rendering (i.e., the luminance of a target pixel and a neighborhood subpixel) for minimizing a fluctuating range of a position-based luminance peak on edge image data of a non-clear type, that is increase or decrease a luminance of a target pixel and that of a neighboring subpixel, and thus, may improve line zagging which occurs in a pixel shift structure.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A display apparatus comprising:

a display panel having a pixel shift structure for three-dimensional (3D) implementation;

a parallax film disposed on the display panel and including a plurality of lenses; and a bypass circuit configured to output edge image data of a clear type in a state where color map conversion corresponding to the pixel shift structure of the display panel is not applied, in a 2D mode, when the edge image data implementing an edge area of a two-dimensional (2D) input image is the clear type.

2. The display apparatus of claim 1, further comprising a detection circuit configured to apply a predetermined operator to the 2D input image data to detect the edge area of the 2D input image, and detect whether the edge image data is the clear type or a non-clear type based on a luminance component variation or a chrominance component variation of edge image data implementing the edge area.

3. The display apparatus of claim 2, further comprising:

a color map conversion circuit configured to convert and output a color map of the edge image data of the non-clear type and a color map of non-edge image data, based on the pixel shift structure of the display panel; and a subpixel rendering circuit configured to perform anti-aliasing of the edge image data of the non-clear type, where the color map has been converted, and output the anti-aliased edge image data.

4. The display apparatus of claim 3, wherein the subpixel rendering circuit varies a luminance of first edge image data which is to be displayed on subpixels of a target pixel and varies a luminance of second edge image data which is to be displayed on one subpixel of a neighborhood pixel adjacent to the target pixel, so that a luminance peak of a luminance profile of each pixel corresponding to the edge image data of the non-clear type is disposed at a center of the each pixel.

5. The display apparatus of claim 1, wherein the display panel comprises a first pixel row including first pixels and a second pixel row including second pixels adjacent to the first pixels, wherein positions of the second pixels are shifted by a predetermined interval in a pixel row direction with respect to positions of the first pixels, and wherein a placement direction of the plurality of lenses is perpendicular to the pixel row direction.

6. The display apparatus of claim 5, wherein the predetermined interval is ¼ of a subpixel width.

7. A data processing method of a display apparatus including a display panel having a pixel shift structure for three-dimensional (3D) implementation and a parallax film disposed on the display panel and including a plurality of lenses, the data processing method comprising:

outputting edge image data of a clear type in a state where color map conversion corresponding to the pixel shift structure of the display panel is not applied when the edge image data implementing an edge area of an input image is the clear type.

8. The data processing method of claim 7, further comprising applying a predetermined operator to two-dimensional (2D) input image data to detect an edge area of a 2D input image, and detecting whether the edge image data is the clear type or a non-clear type based on a luminance component variation or a chrominance component variation of edge image data implementing the edge area.

9. The data processing method of claim 8, further comprising:

converting and outputting a color map of the edge image data of the non-clear type and a color map of non-edge image data, based on the pixel shift structure of the display panel; and performing anti-aliasing of the edge image data of the non-clear type, where the color map has been converted, and outputting the anti-aliased edge image data.

10. The data processing method of claim 9, wherein the performing of the anti-aliasing of the edge image data of the non-clear type comprises varying a luminance of first edge image data which is to be displayed on subpixels of a target pixel and varying a luminance of second edge image data which is to be displayed on one subpixel of a neighborhood pixel adjacent to the target pixel, so that a luminance peak of a luminance profile of each pixel corresponding to the edge image data of the non-clear type is disposed at a center of the each pixel.

* * * * *